Nov. 1, 1932.                    D. L. GORDON                    1,886,243
                         ABSORPTION REFRIGERATION APPARATUS
                                 Filed Oct. 22, 1927
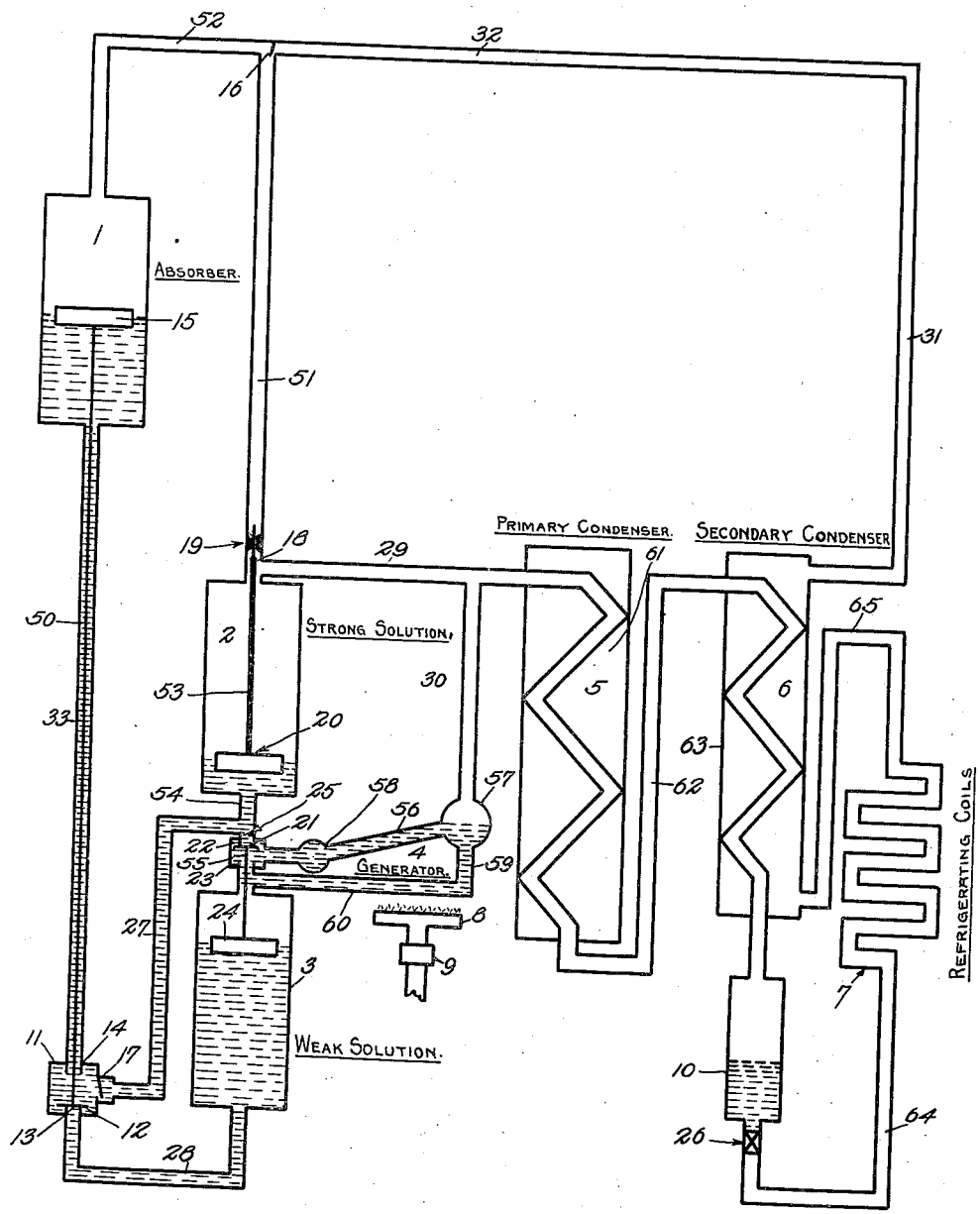
INVENTOR.
DAVID L. GORDON.
BY Munson H. Lane.
ATTORNEY.

Patented Nov. 1, 1932

1,886,243

UNITED STATES PATENT OFFICE

DAVID L. GORDON, OF PITTSBURGH, PENNSYLVANIA

ABSORPTION REFRIGERATION APPARATUS

Application filed October 22, 1927. Serial No. 227,919.

The invention relates to a refrigeration process and apparatus, and more particularly to the absorption type of refrigeration.

The primary object of the invention is to obtain the continuous and automatic operation of a refrigerating system of the absorption type without involving any complicated mechanical device for maintaining circulation. While the attainment of such automatic operation with extremely simple and inexpensive equipment is the principal object, other objects are: to provide for the establishment of conditions of intermittent pressure equilibrium in the various elements of the system; to provide a suitable method for cooling both the absorbent and the refrigerant; to insure safety of operation and accuracy of control of the system so that its capacity may be varied to suit a particular need; to provide means for automatically controlling the temperature of the cooler; and to provide a means for maintaining the system as a whole in a hermetically sealed condition.

The refrigeration process may be operated with any refrigerant which has a suitable absorbent, but in the following description ammonia will be referred to as the refrigerant, and water as the absorbent.

The drawing is a diagrammatic view of a refrigerating system embodying the invention.

Referring to the drawing, the system includes an absorber 1, a strong solution tank 2, a weak solution tank 3, a generator 4, a primary condenser 5, a secondary condenser 6, a cooler 7, a heating element 8, controlled by a thermostat 9, and a liquid receiver 10. These elements are connected and operated by means hereinafter described.

As shown, the elements 1, 2 and 3 are each connected to a valve box 11, which is directly below the absorber 1, and connected to by a passage 33, while the passages 27 and 28 lead to the tanks 2 and 3 respectively.

The valve box 11 is provided with valve seats 13 and 14 upon one or the other of which the valve 12 is seated, this being operated by means of a float 15 within the absorber 1, which float is provided with a stem 50 extending through the vertical passage 33.

A flap valve 17 is placed in the passage 27, this valve opening away from the valve box 11 only.

The tanks 2 and 3 are arranged in vertical alignment and are of substantially the same capacity. A vertical passage 51 extends above the tank 2, such passage opening at the top to passage 52 leading to the top of the absorber 1, and to return passage 32, connected with passage 31 leading from the secondary condenser 6. A one-way valve 16 is located at this junction point, which valve swings only in the direction away from the absorber 1.

Within the vertical passage 51 and just above the tank 2 is a valve seat 19, which may be closed by a float operated valve 18 having a stem 53 upon the lower end of which is a float 20 operating within the tank 2.

The strong solution tank 2 is located directly above the weak solution tank 3, there being a passageway 54 therebetween, into which opens the pipe 27 from the valve chamber 11, with which passageway 54 the generator 4 communicates. Just below the point of attachment of the pipe 27 to the passageway 54 there is located a valve chamber 55 which is provided with an upper valve seat 22 and a lower valve seat 23, upon one or the other of which a valve 21 is seated by means of a float 24 operating in tank 3.

The generator 4 is shown as including tubing 56 opening at one end into the valve box 55 and inclining upwardly to an enlargement 57, there being an enlargement 58 between the valve box 55 and the member 57.

The generator includes also a substantially horizontal pipe 60 which opens into the passageway 54 just above the tank 3, and at its other end communicates with a vertical pipe 59 leading from the upper portion of the generator.

From the generator 4 a pipe 30 leads to the primary condenser 5, and a passage 29 connects the pipe 30 with the top of the strong solution tank 2, thereby insuring equalization of pressure between the generator and the tank 2. The primary condenser 5 is cooled by means of air circulated through the chamber 61. Leading from the primary condenser 5 to the secondary condenser 6 is a pipe 62, which leaves the chamber 62 at the bottom and enters at the top of the chamber 63, enclosing the condenser 6. Below the secondary condenser 6 is a refrigerant receiving chamber 10, the exit from which is controlled by an expansion valve 26. From the expansion valve 26 a pipe 64 leads to the refrigerating coils of the cooler 7, from which cool gases pass by means of pipe 65 to the bottom of chamber 63, leaving at the top through pipe 31 and passing thence through pipes 32 and 52 to the absorber 1.

The operation of the system will now be described. Any desired refrigerant which has a suitable absorbent may be employed, but for the purpose of illustration ammonia will be referred to as the refrigerant and water as the absorbent.

At the beginning of the operation it will be assumed that the tank 2 is filled with a strong solution of aqua ammonia, and tank 3 with weak ammonia. Strong ammonia is also allowed to fill the generator 4, and the absorber 1 is empty. At this stage of the operation, valve 18 is closed by means of float 20, valve 21 is seated upon the upper seat 22 by means of float 24, and the weight of valve 12 causes it to seat on lower seat 13, the float 15 being inoperative at this stage.

When heat is applied to the generator from heater 8 ammonia gas is given off from the strong ammonia in the generator and a pressure is built up in that portion of the system which includes tanks 2 and 3, generator 4, condensers 5 and 6, liquid refrigerant receiver 10, and the various interconnecting passageways including passages 27, 28, 29 and 30. The pressure beyond the expansion valve 26, however, is not materially increased at this stage.

Due to this difference in pressure existing in the different parts of the system, weak ammonia is forced from the weak solution tank 3 to the absorber 1 through passage 28, valve chamber 11 and vertical passage 33. As the liquid is forced into the absorber 1, the float 15 rises and eventually lifts valve 12 from the lower seat 13 to the upper seat 14, thus shutting off any further flow of weak solution from tank 3 into absorber 1.

The outflow of weak liquid from tank 3 and the consequent lowering of the liquid level therein results in the seating of valve 21 on the lower seat 23, due to the weight of the valve and the float. This opens the passage between the strong ammonia tank 2 and the generator 4, allowing the strong solution to flow continuously into the generator, where ammonia gas is evolved by reason of the heat of the generator solution. The weak solution remaining after the evolution of gas, flows from the generator 4 into the weak solution tank 3. The rate of flow from the tank 2 to the generator may be controlled by providing a narrow orifice 25, the size of which may be regulated to suit the particular demand.

The ammonia gas given off from generator 4 passes to the condenser 5 where it is liquefied by air circulating around the piping containing the gas. The liquid ammonia passes to secondary cooler 6 where it is further cooled, and any gas which may remain is liquefied, the liquid then passing into refrigerant container 10.

From the container 10 the liquid passes through expansion valve 26 into expansion coils 7, in which refrigeration is effected. The ammonia gas passing from 7 is still cold and is used as a cooling medium for the condenser 6. Passing from 6, the ammonia gas continues through passages 31, 32 and 52 to the absorber 1, where it is absorbed by the liquid therein, which is relatively weak at the start but becomes progressively stronger as the cycle continues. During this operation the pressure due to the non-absorbed gas likewise becomes progressively stronger.

The cycle is continued until sufficient liquid has passed from the strong liquid tank to allow the level to fall to the point where the float 20 no longer closes the valve 18. When this condition is reached the pressures within the absorber 1, tanks 2 and 3, and generator 4 are equalized, and the valve 16 is closed due to the greater pressure on the absorber side than exists in line 32, and in expander 7. Due to this low pressure in 7 refrigeration continues for a considerable period by the expansion of liquid from tank 10. Soon, however, the valve 21 seats upon the upper seat 22, on account of the rising of the float 24 due to the high level in the weak liquid tank 3. This cuts off the supply of strong ammonia to the generator 4 and the pressure is now reduced in tanks 2, 3, generator 4, tank 10, and the connecting passageways 27, 28, 29, 30, etc.

With the pressures in 1, 2, 3 and 4 equalized by the opening of valve 18 a new cycle of operation commences. The strong liquid in absorber 1 being at a higher level than the liquid in any other part of the system, the now strong liquid flows into tank 2 through passage 33, valve chamber 11, valve 17, and passageway 27. As the liquid level rises in tank 2, the float 20 seats valve 18 on 19, thus closing off the direct connection between the generator and the absorber. The valve 21 is momentarily forced from the seat 22 because of the greater hydrostatic pressure working against it than when it was first seated by the float 24. This momentary opening of the valve 22 allows some strong liquid ammonia to pass into the generator 4, and a high pressure is instantly set up on the condensing side of the system.

The first cycle is now repeated, followed in its turn by the second, in the manner just described. The operation is continuous and entirely automatic, and as the process takes place in a hermetically sealed system, there is no danger of leakage.

When the temperature of the refrigerator, at the coils 7, is of the proper degree the thermostat 9 throttles the heating element 8, thus decreasing the pressure on the condensing side of the system and the rate of evaporation of ammonia through expansion valve 26 is likewise decreased, thus automatically regulating the temperature in the refrigerator.

It may be noted that the generator 4 and passages 59 and 60 do not hold enough liquid to make any appreciable difference in the liquid level in tank 3. It may be further noted that pipe 60 will become dry during the interval in the operating cycle when valve 21, actuated by float 24, is seated upon the valve seat 22.

What I claim is:—

1. In a refrigeration apparatus of the absorption type, including a generator for supplying a refrigerant under pressure, an absorber adapted to receive a medium capable of absorbing said refrigerant, a tank located above said generator adapted to contain a liquid rich in the refrigerant, a tank located below said generator and adapted to receive from said generator an absorptive liquid from which the refrigerant has been largely expelled, and means operated by the pressure of said refrigerant for forcing the absorptive liquid from said tank receiving liquid from the generator, into said absorber.

2. In a refrigeration apparatus of the absorption type, including a generator adapted to give off a refrigerant under pressure and an absorber adapted to contain a liquid capable of absorbing said refrigerant, means for supplying liquid rich in refrigerant to said generator, a tank below said generator for receiving liquid flowing by gravity from said generator after the refrigerant has been largely expelled, an upright pipe extending below said absorber, and having a connection with said tank receiving liquid from said generator, whereby liquid communication is establshed between said receiving tank and said absorber, a float operated by the liquid level in said absorber and a valve in said upright pipe operated by said float for cutting off communication between said tank and said absorber.

3. In a refrigeration apparatus of the absorption type, including a generator adapted to give off a refrigerant under pressure, and an absorber adapted to contain a medium capable of absorbing said refrigerant, a tank for supplying liquid rich in refrigerant to said generator, means for emptying substantially all the liquid in the absorber into the tank at one time, heating means for expelling refrigerant from the generator to the absorber, a tank receiving liquid from said generator from which the refrigerant has been stripped, and valves operated by floats in each of said tanks and in said absorber for controlling the flow of the refrigerant and absorbent media within the system.

4. A refrigeration apparatus comprising a generator, a refrigerating element, an absorber, a tank below the generator for receiving from the generator the weak solution remaining after the evolution of gas, and means or discharging the weak solution from its tank into the absorber until the tank is substantially empty.

5. A refrigeration apparatus comprising a generator, a refrigerating element, an absorber, a single tank having a narrow opening for feeding the generator continuously at the same rate that the supply is separated and its products discharged by the generator until the tank is empty, means for feeding the absorber with waste from the generator, means for filling the tank from the absorber when the tank is empty, and means for cutting off the supply of liquid to the generator until the tank is filled.

6. A refrigerating apparatus comprising a generator, a refrigerating element, an absorber, a conduit connecting the refrigerating element and absorber, a conduit leading from the generator to said first-named conduit and opening thereinto between the refrigerator element and the absorber, a valve in said last-named conduit, and a check valve cutting off communication between the refrigerating element on the one hand, and the absorber and generator on the other, when the other valve is open.

7. A refrigeration apparatus comprising a generator, a supply tank therefor, a tank for receiving liquid from the generator, the generator being wholly outside the receiving tank, a float in the receiving tank, and a valve controlled thereby, said valve alternately cutting off and opening communication between the supply tank and generator.

8. A refrigeration apparatus comprising a generator, a supply tank therefor, a tank for receiving liquid from the generator, a passage directly connecting the tanks, another passage connecting the tanks through the generator, a float in the receiving tank, and a valve controlled thereby, said valve alternately closing both passages and the direct passage.

9. A refrigeration apparatus comprising a generator, a tank above the generator communicating therewith, a tank below the generator communicating therewith, an absorber higher than the first-named tank, communicating with both tanks, and means including valves for intermittently causing gas from the generator to discharge the contents of the last-named tank into the absorber, and for opening the passage from the absorber to the first-named tank when the latter is empty.

10. The herein described process of refrigeration, which comprises expelling a refrigerant from a strong solution, collecting the resultant weak solution for a considerable period of time in a place removed from the place of expulsion, transferring substantially all the collected weak solution at one time to an elevation greater than that of the expelling device, absorbing the used refrigerant in the weak solution, and finally feeding the strong solution back to the place of beginning.

11. The herein described process of refrigeration, which comprises separating the refrigerant from a strong solution, storing a quantity of the weak solution thus obtained, elevating said solution by pressure of the refrigerant, exposing the weak solution to the used refrigerant, permitting substantially all the solution to escape by gravity, again storing it at a higher level than the original place of storage, and feeding it from there to the place of separation.

12. A refrigeration apparatus comprising a generator having an inlet and an outlet for liquid, a passage leading laterally from said inlet, and having a gas outlet at its other end, a return passage leading to said liquid outlet, a refrigerating element, an absorber, a heater below said return passage, and means for causing the entire body of a stream of a strong solution of a refrigerant to flow past the gas outlet and heater.

13. A refrigeration apparatus comprising an absorber, a refrigerating element, and a conduit having a valved inlet and an outlet for liquids, and a gas outlet intermediate said liquid inlet and outlet, in combination with a heater below said conduit, a passage leading from the gas outlet to the refrigerating element, a passage leading from the refrigerating element to the absorber, a passage from the absorber to the said liquid inlet, and a passage from the said liquid outlet to the absorber.

In testimony whereof I affix my signature.

DAVID L. GORDON.